US012706979B1

(12) United States Patent
Shabi et al.

(10) Patent No.: US 12,706,979 B1
(45) Date of Patent: Aug. 11, 2026

(54) SYSTEM AND METHOD FOR REAL TIME GOVERNANCE OF AI AGENTS IN A CLOUD COMPUTING ENVIRONMENT

(71) Applicant: Linx Ltd., Tel Aviv (IL)

(72) Inventors: Mor Shabi, Tel Aviv (IL); Amir Hamenahem, Tel Aviv (IL); Niv Goldenberg, Brooklyn, NY (US); Uri Ezra, Tel Aviv (IL); Hila Ohayon Bahri, Yavne (IL); Sharon Eizner, Tel Aviv (IL); Ben Bakhar, Tel Aviv (IL)

(73) Assignee: Linx Ltd., Tel Aviv (IL)

( * ) Notice: Subject to any disclaimer, the term of this patent is extended or adjusted under 35 U.S.C. 154(b) by 0 days.

(21) Appl. No.: 19/418,592

(22) Filed: Dec. 12, 2025

(51) Int. Cl.
*H04L 67/53* (2022.01)
*H04L 67/51* (2022.01)
*G06F 11/07* (2006.01)
*G06K 19/06* (2006.01)

(52) U.S. Cl.
CPC .................................... *H04L 67/51* (2022.05)

(58) Field of Classification Search
CPC .......... H04L 67/51; H04L 67/53; G06F 11/07; G06K 19/06
USPC ........................................................ 709/203
See application file for complete search history.

(56) References Cited

U.S. PATENT DOCUMENTS

| | | | | |
|---|---|---|---|---|
| 10,693,872 | B1 | 6/2020 | Larson et al. | |
| 12,205,210 | B2 | 1/2025 | Lebaredian et al. | |
| 2021/0365445 | A1 | 11/2021 | Robell et al. | |
| 2024/0086793 | A1 | 3/2024 | Brown et al. | |
| 2025/0377967 | A1* | 12/2025 | Malleshaiah | G06F 11/079 |
| 2025/0390768 | A1* | 12/2025 | Turrell | G06N 5/022 |

* cited by examiner

*Primary Examiner* — Jude Jean Gilles
(74) *Attorney, Agent, or Firm* — M&B IP Analysts, LLC

(57) ABSTRACT

A system and method for discovering artificial intelligence (AI) agent identities operating in a cloud computing environment and applying controls on the same, is presented. The method detecting a plurality of identities across multiple identity provider (IdP) systems of a cloud computing environment; detecting in the plurality of identities a first identity corresponding to an AI agent; generating a representation of the detected plurality of identities including the first identity based on a unified identity model; and applying a control on the first identity in the generated representation.

19 Claims, 4 Drawing Sheets

SYSTEM AND METHOD FOR REAL TIME GOVERNANCE OF AI AGENTS IN A CLOUD COMPUTING ENVIRONMENT

TECHNICAL FIELD

The present disclosure relates generally to identity management and security in enterprise systems, and specifically to techniques for discovering, modeling, and governing AI agent identities by enforcing least-privilege access, providing visibility into agent capabilities and risks, and detecting agents based on behavioral characteristics.

BACKGROUND

Modern enterprises are increasingly interacting with autonomous AI agents that operate across diverse environments, including SaaS platforms, cloud services, and local devices. Unlike traditional applications or predefined workflows, these agents may receive broad access to organizational resources and act independently, making their behavior difficult to predict or constrain. Employees can create and deploy such agents without centralized oversight, resulting in a lack of visibility into how many agents exist, what access they hold, and what actions they perform.

Existing identity systems often do not distinguish agents from human or conventional non-human identities, preventing accurate classification and governance. Additionally, some agents or AI-driven tools may function without declaring themselves as such, or may operate under ordinary user or service accounts, complicating efforts to recognize their presence. Attackers or offensive security actors may also leverage AI tools that mimic agent-like behavior, creating further uncertainty about whether observed activity originates from humans, standard software, or autonomous agents.

These factors collectively introduce risks related to excessive permissions, inappropriate access to sensitive data, privilege escalation, and the inability to review or validate the appropriateness of agent actions within the organization.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include detecting a plurality of identities across multiple identity provider (IdP) systems of a cloud computing environment. The method may also include detecting in the plurality of identities a first identity corresponding to an AI agent. The method may furthermore include generating a representation of the detected plurality of identities including the first identity based on an unified identity model. The method may in addition include applying a control on the first identity in the generated representation. Other embodiments of this aspect include corresponding computer systems, apparatus, and computer programs recorded on one or more computer storage devices, each configured to perform the actions of the methods.

Implementations may include one or more of the following features. The method may include: determining that the first identity corresponds to an AI agent based on a detection associating the first identity with an AI software as a service application. The method may include: applying a first control on the first identity; and applying a second control on a second identity, the second identity associated with a human user, where the first control is more restricted than the second control. The method may include: generating an inventory of a group of identities of the plurality of identities, each identity in the group of identities associated with an AI agent. The method may include: associating the group of identities with a registered AI agent, a discovered AI agent, and an inferred AI agent. The method may include: applying the control to periodically initiate an user access review for the first identity. The method may include: applying the control on the generated representation to include any one of: disabling the first identity, blocking the first identity from performing additional operations, halting request-execution capabilities associated with the first identity, preventing the first identity from accessing enterprise computing resources, or any combination thereof. The method may include: generating a behavior baseline of the first identity based on a plurality of actions initiated by the first identity; and determining that the first identity is associated with the AI agent based on the behavior baseline matching a predetermined agentic behavior. The method may include: determining that the first identity is associated with the AI agent based on the behavior baseline mismatching a predetermined human user behavior baseline. Implementations of the described techniques may include hardware, a method or process, or a computer tangible medium.

In one general aspect, non-transitory computer-readable medium may include one or more instructions that, when executed by one or more processing circuitries of a device, cause the device to: detect a plurality of identities across multiple identity provider (IdP) systems of a cloud computing environment; detect in the plurality of identities a first identity corresponding to an AI agent; generate a representation of the detected plurality of identities including the first identity based on an unified identity model; and apply a control on the first identity in the generated representation. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: detect a plurality of identities across multiple identity provider (IdP) systems of a cloud computing environment. The system may in addition detect in the plurality of identities a first identity corresponding to an AI agent. The system may moreover generate a representation of the detected plurality of identities including the first identity based on an unified identity model. The system may also apply a control on the first identity in the generated representation. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: determine that the first identity corresponds to an AI agent based on a detection associating the first identity with an AI software as a service application. The system where the memory contains further instructions which when executed by the processing circuitry further configure the system to: apply a first control on the first identity; and apply a second control on a second identity, the second identity associated with a human user, where the first control is more restricted than the second control. The system where the memory contains further instructions which when executed by the processing circuitry further configure the system to: generate an inventory of a group of identities of the plurality of identities, each identity in the group of identities associated with an AI agent. The system where the memory contains further instructions which when executed by the processing circuitry further configure the system to: associate the group of identities with a registered AI agent, a discovered AI agent, and an inferred AI agent. The system where the memory contains further instructions which when executed by the processing circuitry further configure the system to: apply the control to periodically initiate an user access review for the first identity. The system where the memory contains further instructions which when executed by the processing circuitry further configure the system to: apply the control on the generated representation to include any one of: disable the first identity, blocking the first identity from performing additional operations, halting request-execution capabilities associated with the first identity, preventing the first identity from accessing enterprise computing resources, or any combination thereof. The system where the memory contains further instructions which when executed by the processing circuitry further configure the system to: generate a behavior baseline of the first identity based on a plurality of actions initiated by the first identity; and determine that the first identity is associated with the AI agent based on the behavior baseline matching a predetermined agentic behavior. The system where the memory contains further instructions which when executed by the processing circuitry further configure the system to: determine that the first identity is associated with the AI agent based on the behavior baseline mismatching a predetermined human user behavior baseline. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
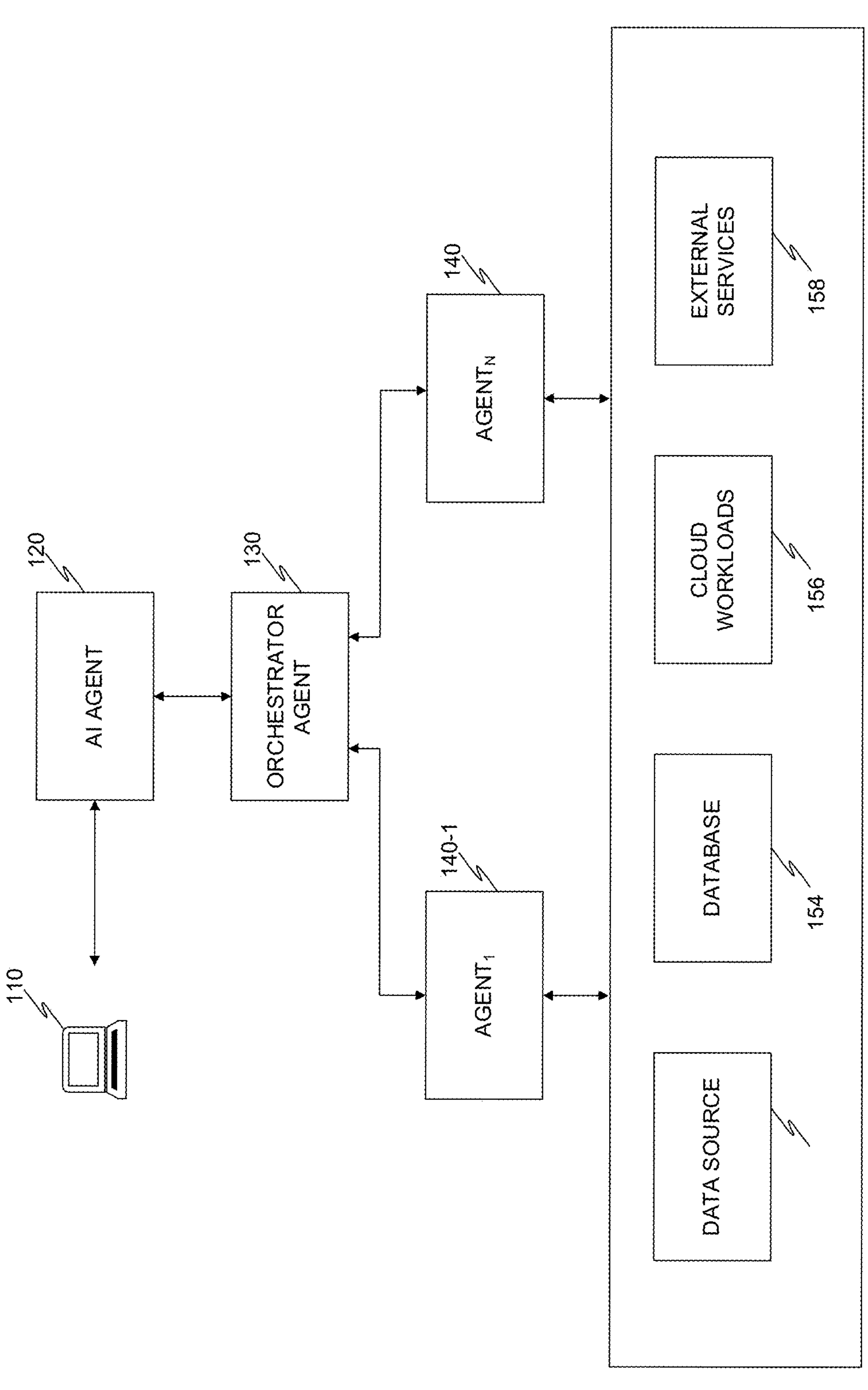
FIG. 1 is an example schematic diagram of an agentic workflow of an enterprise computing environment, utilized in an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic diagram of an agentic workflow of an enterprise computing environment, utilized in an embodiment. According to an embodiment, a user device 110 is configured to interact with an AI agent 120 through one or more communication interfaces, which may include graphical user interfaces (GUIs), application programming interfaces (APIs), messaging interfaces, or natural-language chat interfaces. In an embodiment, the AI agent 120 is configured to receive natural-language queries, instructions, and prompts originating from the user device 110, and to generate corresponding natural-language responses. In some embodiments, the AI agent 120 is implemented using a generative artificial intelligence model, such as a large language model (LLM), foundation model, multimodal generative model, or any machine-learning model capable of producing context-dependent textual output.

In certain embodiments, the AI agent 120 is further configured to receive structured or unstructured requests from a user or another software component, and may therefore function as a request handler. In some embodiments, the AI agent 120 is configured to transmit requests, validated requests, or approved requests to an orchestrator agent 130. In an embodiment, approval may be determined according to one or more guardrails, constraints, policies, or rule sets governing what types of requests the AI agent 120 is permitted to forward.

In some embodiments, the orchestrator agent 130 comprises a software service, microservice, or distributed service component configured to receive a request from the AI agent 120, decompose the received request into a plurality of sub-requests, and dispatch each sub-request to a corresponding specialized software agent among a plurality of specialized agents 140-1 through 140-N (collectively, specialized agents 140), where N is an integer equal to or greater than two. In some embodiments, each sub-request corresponds to a different functional capability, domain, workflow step, or system integration required to fulfill the original request.

According to an embodiment, each specialized agent 140 is configured to access, query, retrieve, modify, or interact with resources within an organization's computing environment 150. In various embodiments, the computing environment 150 may include a cloud computing environment, an on-premises computing environment, a multi-cloud deployment, a hybrid cloud architecture, or any combination of computational infrastructure comprising physical, virtualized, or containerized resources.

In an embodiment, the computing environment 150 comprises one or more resource types, including a data source 152, a database 154, a cloud workload 156, an external service 158, various combinations thereof, or other enterprise computing assets. A data source 152 may include, but is not limited to, organizational wikis, knowledge bases, documentation repositories, or collaboration pages such as Confluence® pages. A database 154 may include a relational database management system (RDBMS), an object database, a SQL or NoSQL database, or a managed cloud database service. A cloud workload 156 may comprise an application or process executing on a virtual machine, a containerized software instance, a serverless function, a distributed application component, or any combination thereof.

In an embodiment, an external service 158 may include third-party or external software-as-a-service (SaaS) platforms, external AI agents, version-control systems such as GitHub®, ticketing or workflow systems, or other externally hosted services accessible via APIs, authentication protocols, federated identity systems, or other communication mechanisms. In some embodiments, such external services may expose sensitive organizational data, perform actions on behalf of organizational identities, or integrate with internal enterprise resources through delegated or authenticated access.

Figure 2:
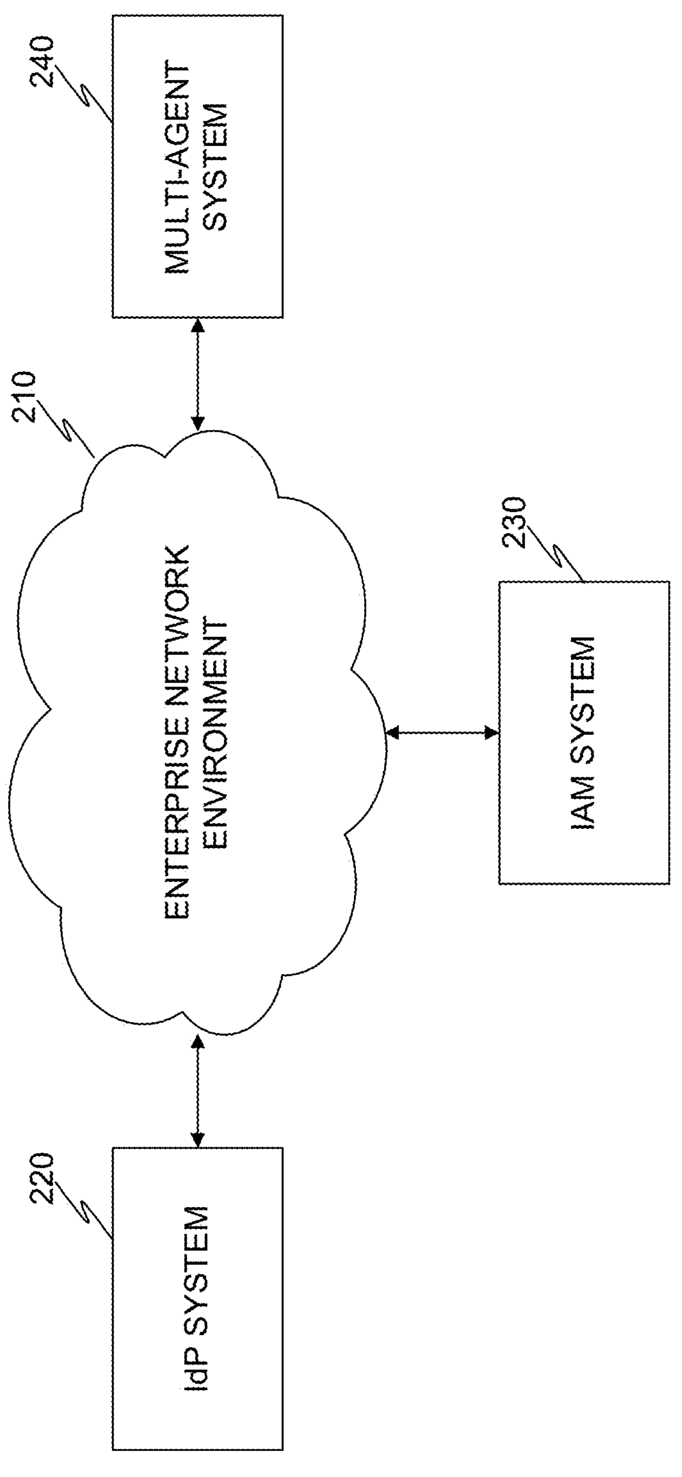
FIG. 2 is an example schematic diagram of an enterprise computing environment utilizing a unified identity and access management system, implemented in accordance with an embodiment.

FIG. 2 is an example schematic diagram of an enterprise computing environment utilizing a unified identity and access management system, implemented in accordance with an embodiment. In an embodiment, the enterprise computing environment 210 includes, incorporates, or hosts the computing environment 150 described herein.

According to an embodiment, the enterprise computing environment 210 includes, communicates with, or otherwise interoperates with an identity provider (IdP) system 220. In some embodiments, the IdP system 220 is configured to generate, provision, register, authenticate, manage, modify, store, deactivate, or otherwise maintain digital identities utilized by components, services, users, or agents operating within the enterprise computing environment 210. In various embodiments, such identities may include human user identities, non-human or machine identities, application identities, service accounts, or identity types specifically designated for AI agents.

In an embodiment, the enterprise computing environment 210 includes, or is granted programmatic access to, a multi-agent system 240. According to an embodiment, the multi-agent system 240 comprises a plurality of AI agents, autonomous software agents, or machine-implemented agents, each associated with or mapped to a corresponding identity of the IdP system 220. In certain embodiments, each AI agent of the multi-agent system 240 may be represented within the IdP as an application identity, machine identity, service identity, agent-specific identity type, or other identity record maintained by the IdP system 220. In some embodiments, the plurality of AI agents may execute on distributed infrastructures, cloud services, local endpoints, or orchestrator frameworks and may perform operations on behalf of their associated identities within the enterprise computing environment 210.

In some embodiments, the enterprise computing environment 210 is further connected to, or integrated with, a unifying identity and access management (IAM) system 230. In an embodiment, the IAM system 230 is configured to receive identity-related data, event data, access-permission data, entitlement data, authentication metadata, or other identity state information from a plurality of IdP systems, such as IdP system 220. The IAM system 230 may be further configured to ingest, normalize, correlate, or consolidate identity information across multiple identity domains, thereby generating a unified, enterprise-wide representation of every identity interacting with, or existing within, the enterprise computing environment 210. In certain embodiments, the unified representation may reflect relationships among identities, associated AI agents, access footprints across cloud and on-prem systems, and contextual metadata relevant to the identities' behavior or operational reach within the environment.

In certain embodiments, the IAM system 230 is configured to generate an identity model that includes a machine-interpretable representation of an AI agent identity, derived from information collected across multiple discovery channels within the enterprise computing environment 210. In an embodiment, the identity model incorporates identity attributes obtained from one or more agent-discovery sources, including: declared or customer-specified SaaS agent providers, externally managed agent platforms that operate outside the IdP system 220, shadow agents identified through inspection of third-party applications connected to user accounts via federated authentication providers, shadow agents detected via endpoint management or IT configuration systems that reveal agent software installed on enterprise devices, agent identities registered natively within the IdP system 220, such as identities classified under an agent-specific identity type, various combinations thereof, and the like.

In some embodiments, the identity model further includes relational and contextual data describing the agent's operational placement, e.g., whether the AI agent executes as a SaaS application, cloud-hosted service, browser-embedded assistant, local desktop agent, etc., and the identity model may store information regarding the users associated with the agent, the set of platforms on which the agent runs, and the enterprise resources to which the agent has access.

In an embodiment, the IAM system 230 is configured to detect identities associated with AI agents, including identities explicitly defined as AI agents in the IdP system 220 and identities inferred to be associated with AI agents based on discovery signals acquired from SaaS integrations, cloud resource logs, endpoint-management telemetry, federated-auth metadata, or user-linked third-party application records. In some embodiments, detection includes identifying identities that behave as autonomous request handlers, orchestrators, or specialized agents within a multi-agent system 240, including agents capable of accessing workloads such as calendars, collaboration platforms (e.g., Notion, Google Box), cloud computing resources (e.g., GCP workloads), private user accounts, enterprise services or external systems, various combinations thereof, and the like.

In certain embodiments, detection may further encompass identifying agents by their operational role, e.g., assistant agents, workflow-manager agents, researcher agents, or other functional agent types, based on behavioral patterns, established behavioral baselines, resource-access footprints, or their association with orchestrator-generated sub-requests. In an embodiment, detection encompasses detecting a behavioral pattern, baseline, etc., and matching the pattern to a predetermined human behavior baseline, a predetermined agentic behavior baseline, and the like.

In some embodiments, the IAM system 230 is configured to apply governance and control to the model of the AI agent, including governance functions applied to other identities, but tailored to the autonomous and dynamic nature of AI agents. In various embodiments, governance includes evaluating the permissions and entitlements associated with the AI agent identity, determining whether those permissions align with role-appropriate least-privilege expectations, identifying excessive or high-risk access patterns, correlating the agent's accessible resources with enterprise risk posture, combinations thereof, and the like.

In an embodiment, governance may further include enabling periodic identity reviews, such as user access review (UAR) processes, where the system may assess the continued necessity of the AI agent itself, of permissions granted to the AI agent, flag agents with unnecessary permissions, identify agents shared among too many users, or determine whether an agent should be disabled or offboarded. In some embodiments, the IAM system 230 is configured to apply governance boundaries to the agent identity model, including the identification of resource categories the agent should not access, limiting the agent's operational scope within the enterprise computing environment, or determining conditions under which agent-generated access requests may be approved, denied, or restricted. In certain embodiments, the application of governance and control on the AI agent identity model provides the enterprise with visibility into agent inventories, risk concentration areas, and potential security exposure associated with autonomous agent behavior.

Figure 3:
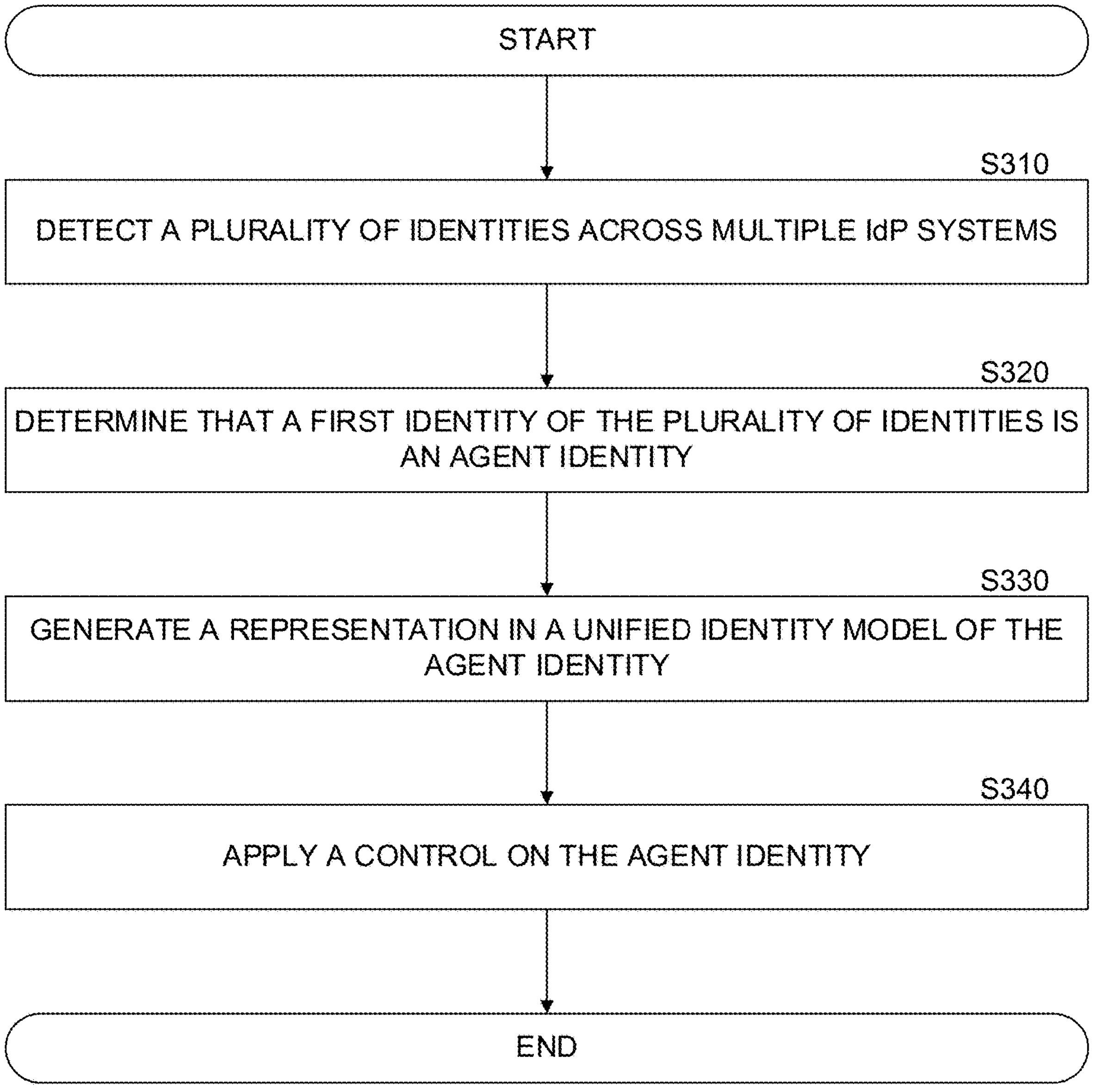
FIG. 3 is an example flowchart of a method for discovering AI agent identities and applying governance on the same, implemented in accordance with an embodiment.

FIG. 3 is an example flowchart of a method for discovering AI agent identities and applying governance on the same, implemented in accordance with an embodiment.

At S310, a plurality of identities are detected across one or more IdP systems. In an embodiment, the plurality of identities are detected across a plurality of heterogeneous IdP systems, each IdP system maintaining identity records using a distinct schema, data model, naming convention, or identity-attribute structure. In some embodiments, the plurality of IdP systems collectively provide authentication, authorization, single sign-on (SSO), or directory-management services to a single organization operating across one computing environment, multiple isolated computing environments, multi-cloud infrastructures, hybrid cloud infrastructures, and various combinations thereof. In certain embodiments, each IdP system may correspond to a different identity domain, such as a cloud-provider directory service, a SaaS-integrated identity service, a developer-platform identity system, an enterprise on-premises identity directory, combinations thereof, and the like.

In an embodiment, the plurality of identities include a diverse set of identity types, such as user identities corresponding to human users, machine or service-account identities utilized by software services, automation systems, cloud workloads, or orchestrated application components, AI agent identities corresponding to autonomous agents, orchestrator agents, specialized agents, request-handling agents, or other machine-implemented agents, various combinations thereof, and the like.

In some embodiments, the detected identities may include identities explicitly registered as agents by the IdP, identities associated with SaaS-hosted or externally managed agent platforms, identities inferred from third-party application integrations authenticated via the IdP, identities associated with agent software discovered on enterprise endpoints or device-management systems, combinations thereof, and the like.

In some embodiments, detection includes retrieving identity records, identity-attribute sets, entitlement information, group memberships, application assignments, authentication metadata, or linked-resource information from the plurality of IdP systems. In certain embodiments, the identities detected across the various IdP systems may represent overlapping, partially duplicated, or logically related identity objects that correspond to a single underlying human user, machine entity, or AI agent operating within the enterprise.

At S320, a first identity of the plurality of identities is determined to be an AI agent identity. In an embodiment, determining that the first identity is an AI agent identity includes evaluating identity information collected from a plurality of agent-discovery channels, including explicit, external, implicit, and endpoint-based sources of agent-related identity data.

In some embodiments, determining that the first identity is an AI agent identity includes receiving information from declared SaaS agent providers, where an IdP system explicitly identifies one or more SaaS-hosted agents used within the enterprise. In an embodiment, identity information associated with the declared SaaS agent is obtained from the corresponding SaaS provider using existing enterprise connectors or integrations, enabling the system to identify and classify the corresponding identity in the IdP system as belonging to an AI agent.

In some embodiments, determining that the first identity is an AI agent identity includes detecting identities associated with externally managed agent services that do not integrate with, or authenticate through, an IdP system. In such embodiments, the system obtains identity information using dedicated connectors that interface directly with the external agent platform, thereby identifying machine-implemented services that function as AI agents even though they are not represented in the IdP system.

In certain embodiments, determining that the first identity is an AI agent identity includes identifying shadow agents revealed through third-party application integrations observed in an IdP system. For example, when a user authenticates to an agent-driven tool using "Sign in with Google," the IdP system may record a third-party application connection associated with the user account. In an embodiment, the system inspects such application-connection metadata (e.g., application identifiers recorded by Google or Azure) and, upon detecting an agent-style application such as "ChatGPT desktop," may classify the corresponding identity as an AI agent identity, even when the organization has not explicitly declared the agent.

In some embodiments, determining that the first identity is an AI agent identity includes detecting shadow agents via endpoint management, or IT configuration systems. These systems track installed applications on enterprise endpoints. In an embodiment, identity information indicating that an agent application (e.g., "ChatGPT desktop") is installed on a machine associated with the identity may cause the system to determine that the first identity corresponds to an AI agent, even when the agent is not represented within the IdP system and has not been authorized as an enterprise application.

In certain embodiments, determining that the first identity is an AI agent identity includes identifying identities stored directly within an IdP system that supports agent-specific identity types. For example, certain IdPs may classify an identity as an "agent" or "application agent." In such embodiments, the system detects, imports, and classifies these IdP-registered agent identities as AI agent identities. These may be treated as more formally registered or controlled agent identities relative to shadow or externally managed agents.

Across these discovery channels, determining that the first identity is an AI agent identity may include correlating indicators from multiple sources, such as explicit declarations, SaaS-provider data, external-platform metadata, IdP third-party application lists, endpoint software inventories, and native agent classifications in the IdP system, to conclude that the identity operates as an autonomous software agent.

In some embodiments, determining that the first identity is an AI agent identity further comprises mapping the detected identity to an agent profile indicative of an orchestrator agent, specialized agent, assistant agent, workflow-manager agent, researcher agent, or other agent role, based on the context associated with the identity's resource-access patterns and operational footprint within the enterprise computing environment.

At S330, a representation of identities is generated. In an embodiment, the representation of identities is generated in a unified identity model of an identity and access management service. In an embodiment, generating the representation of identities includes creating a machine-interpretable, consolidated representation of all identities detected across the plurality of IdP systems, external agent platforms, endpoint-management sources, and SaaS integrations. In some embodiments, the representation includes a normalized set of identity attributes derived from heterogeneous identity formats, schemas, naming conventions, privilege structures, or entitlement models originating from disparate identity providers and discovery channels.

In an embodiment, the representation of identities is generated within a unified identity model maintained by an identity and access management (IAM) service. In some embodiments, generating the unified identity model includes aggregating and merging identity records associated with a single logical entity, such as a human user, service account, or AI agent identity, across multiple identity domains. In certain embodiments, the unified identity model includes canonical identity attributes, such as identity type (human, service, AI agent), role classification, associated resources, entitlements, authentication metadata, relationship mappings, and cross-environment access footprints.

In an embodiment, generating the representation includes constructing identity graphs or relationship models, wherein each identity is represented as a node connected to one or more resources, applications, SaaS services, cloud workloads, users, or other agents with which it interacts. In some embodiments, this includes associating each AI agent identity with its operational context, e.g., identifying whether it operates as an orchestrator agent, a request-handling agent, or a specialized agent, and linking the agent to its discovered access points, such as calendars, cloud services, collaboration platforms, private accounts, or third-party applications.

In certain embodiments, generating the representation of identities includes incorporating discovery signals obtained from declared SaaS agent providers, externally managed agent platforms not integrated with IdP systems, third-party application metadata exposed through federated authentication providers, endpoint telemetry indicating agent software installed on enterprise devices, IdP-native agent identity types, and the like.

In some embodiments, the unified identity model is configured to maintain identity lineage, identity provenance, or identity-source attribution, enabling the IAM system to indicate which discovery mechanism contributed to the classification of each identity. In an embodiment, the unified identity model facilitates downstream identity-governance operations by maintaining a complete and coherent representation of every identity within the enterprise computing environment.

At S340, a control is applied on the representation. In an embodiment, applying a control includes performing one or more governance, oversight, enforcement, remediation, identity-lifecycle action, and the like, on the unified representation of identities. In some embodiments, applying a control includes evaluating identity attributes, entitlements, resource access relationships, and contextual metadata associated with an AI agent identity, a human user identity, or a service-account identity.

In an embodiment, applying a control includes applying least-privilege access to an AI agent identity. This may include determining, based on the identity model, whether an AI agent's existing entitlements exceed the entitlements appropriate for the agent's defined role (e.g., assistant agent, workflow-manager agent, researcher agent), analyzing the scope of resources the agent is capable of accessing, and restricting or reducing those entitlements to the minimum necessary for functionality. In some embodiments, this includes identifying access to high-risk systems, private accounts, administrative interfaces, broad-scope permissions, and the like, and constraining the AI agent's permissions accordingly, for example by generating an instruction for execution by an appropriate IdP system.

In some embodiments, applying a control includes applying policies on requests made by an AI agent identity to access resources of an enterprise computing environment. The such requests may be initiated by orchestrator agents, specialized agents, or request-handling agents. In various embodiments, applying policies may include evaluating an AI agent's request against predefined identity-governance rules, enterprise access policies, resource-scope restrictions, temporal restrictions, or guardrails configured to permit, deny, or conditionally allow the requested access. In some embodiments, the control includes determining whether the AI agent identity may access a SaaS service, cloud workload, collaboration platform, private account, external service, or other enterprise resource.

According to an embodiment, applying a control includes generating an inventory of AI agent identities. In some embodiments, the inventory includes all registered, discovered, or inferred AI agent identities across the various identity-discovery channels, including declared SaaS agents, externally managed agent services, shadow agents detected via IdP third-party application metadata, shadow agents detected via endpoint telemetry, IdP-registered agent identities, combinations thereof, and the like. In certain embodiments, the inventory additionally includes metadata describing each agent's associated users, associated resources, risk indicators, operational role, and access patterns.

In an embodiment, applying a control includes initiating periodic user access review (UAR) processes for identities represented in the unified identity model. In some embodiments, applying a UAR includes prompting administrators, security personnel, or system owners to review the entitlements of AI agent identities, determine whether the permissions remain necessary, identify over-privileged agents, and mark agents for modification, restriction, or removal. In various embodiments, the UAR process also applies to human user identities and service-account identities represented within the unified model.

In certain embodiments, applying a control includes offboarding an AI agent identity. Offboarding may include removing one or more entitlements from the AI agent identity, detaching the agent from associated resources, disassociating the agent from its executing platform, or marking the identity as inactive. In some embodiments, applying a control includes disabling an AI agent identity, blocking the agent from performing additional operations, halting its request-execution capabilities, or preventing it from accessing enterprise computing resources. In some embodiments, the control includes combinations thereof, such as offboarding followed by disabling, or other lifecycle-state transitions appropriate for the AI agent's status within the enterprise.

In certain embodiments, applying a control also includes identifying high-risk AI agent identities, determining whether an agent is shared among too many users, determining whether an agent has administrative or broad-scope capabilities, or enforcing limits based on enterprise governance rules.

Figure 4:
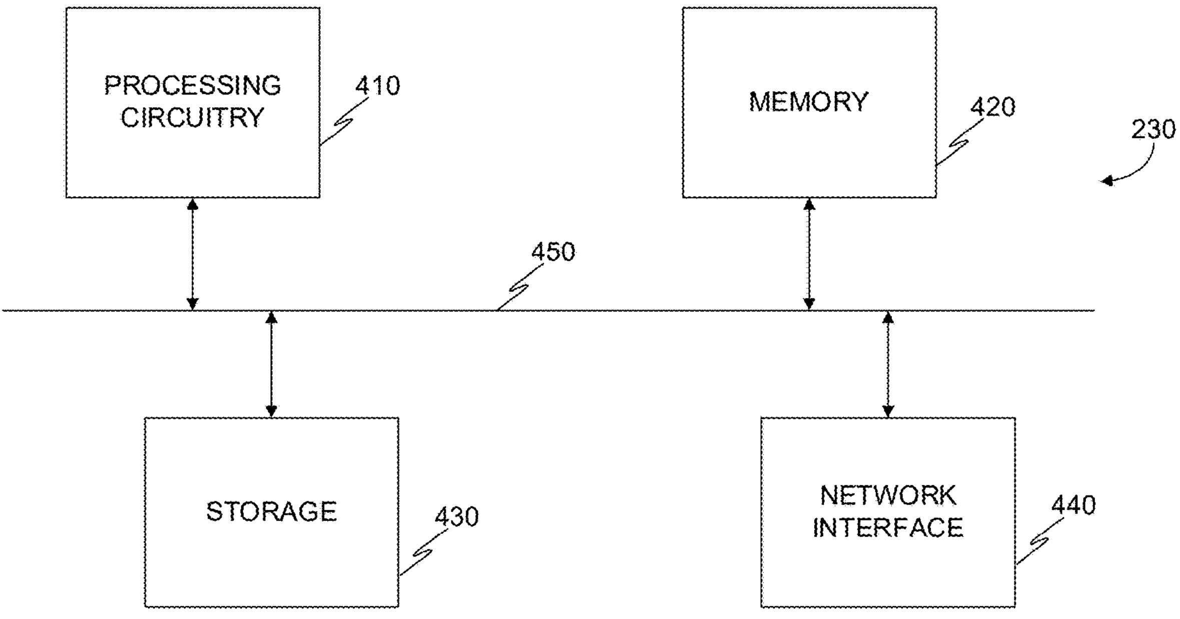
FIG. 4 is an example schematic diagram of an IAM system according to an embodiment.

FIG. 4 is an example schematic diagram of an IAM system 230 according to an embodiment. The IAM system 230 includes, according to an embodiment, a processing circuitry 410 coupled to a memory 420, a storage 430, and a network interface 440. In an embodiment, the components of the IAM system 230 are communicatively connected via a bus 450.

In certain embodiments, the processing circuitry 410 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 420 is a volatile memory (e.g., random access memory, etc.), a non-volatile memory (e.g., read only memory, flash memory, etc.), a combination thereof, and the like. In some embodiments, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein is stored in the storage 430, in the memory 420, in a combination thereof, and the like. The software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 410, cause the processing circuitry 410 to perform the various processes described herein, in accordance with an embodiment.

In some embodiments, the storage 430 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 440 is configured to provide the IAM system 230 with communication with, for example, enterprise network environment 210, the IdP system 220, the multi-agent system 240, combinations thereof, and the like, according to an embodiment.

It should be understood that the embodiments described herein are not limited to the specific architecture illustrated in FIG. 4, and other architectures may be equally used without departing from the scope of the disclosed embodiments.

Furthermore, in certain embodiments the IAM system 230, the IdP system 220, the multi-agent system 240, combinations thereof, and the like, may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for discovering artificial intelligence (AI) agent identities operating in a cloud computing environment and applying controls, comprising: detecting a plurality of identities across multiple identity provider (IdP) systems of a cloud computing environment; detecting in the plurality of identities a first identity corresponding to an AI agent; generating a representation of the detected plurality of identities, including the first identity based on a unified identity model; and applying a control on the first identity in the generated representation.

2. The method of claim 1, further comprising:

determining that the first identity corresponds to an AI agent based on a detection associating the first identity with an AI software as a service application.

3. The method of claim 1, further comprising:

applying a first control on the first identity; and applying a second control on a second identity, the second identity associated with a human user, wherein the first control is more restricted than the second control.

4. The method of claim 1, further comprising:

generating an inventory of a group of identities of the plurality of identities, each identity in the group of identities associated with an AI agent.

5. The method of claim 4, further comprising:

associating the group of identities with a registered AI agent, a discovered AI agent, and an inferred AI agent.

6. The method of claim 1, further comprising:

applying the control to periodically initiate a user access review for the first identity.

7. The method of claim 1, further comprising:

applying the control on the generated representation to include any one of: disabling the first identity, blocking the first identity from performing additional operations, halting request-execution capabilities associated with the first identity, preventing the first identity from accessing enterprise computing resources, or any combination thereof.

8. The method of claim 1, further comprising:

generating a behavior baseline of the first identity based on a plurality of actions initiated by the first identity; and determining that the first identity is associated with the AI agent based on the behavior baseline matching a predetermined agentic behavior.

9. The method of claim 8, further comprising:

determining that the first identity is associated with the AI agent based on the behavior baseline, mismatching a predetermined human user behavior baseline.

10. A non-transitory computer-readable medium storing a set of instructions for discovering artificial intelligence (AI) agent identities operating in a cloud computing environment and applying controls, the set of instructions comprising: one or more instructions that, when executed by one or more processing circuitries of a device, cause the device to: detect a plurality of identities across multiple identity provider (IdP) systems of a cloud computing environment; detect in the plurality of identities a first identity corresponding to an AI agent; generate a representation of the detected plurality of identities including the first identity based on a unified identity model; and apply a control on the first identity in the generated representation.

11. A system for discovering artificial intelligence (AI) agent identities operating in a cloud computing environment and applying controls comprising: a processing circuitry; a memory, the memory containing instructions that, when executed by the processing circuitry, configure the system to: detect a plurality of identities across multiple identity provider (IdP) systems of a cloud computing environment; detect in the plurality of identities a first identity corresponding to an AI agent; generate a representation of the detected plurality of identities including the first identity based on a unified identity model; and apply a control on the first identity in the generated representation.

12. The system of claim 11, wherein the memory contains further instructions which when executed by the processing circuitry further configure the system to:

determine that the first identity corresponds to an AI agent based on a detection associating the first identity with an AI software as a service application.

13. The system of claim 11, wherein the memory contains further instructions which when executed by the processing circuitry further configure the system to:

apply a first control on the first identity; and apply a second control on a second identity, the second identity associated with a human user, wherein the first control is more restricted than the second control.

14. The system of claim 11, wherein the memory contains further instructions which when executed by the processing circuitry further configure the system to:

generate an inventory of a group of identities of the plurality of identities, each identity in the group of identities associated with an AI agent.

15. The system of claim 14, wherein the memory contains further instructions which when executed by the processing circuitry further configure the system to:

associate the group of identities with a registered AI agent, a discovered AI agent, and an inferred AI agent.

16. The system of claim 11, wherein the memory contains further instructions which when executed by the processing circuitry further configure the system to:

apply the control to periodically initiate a user access review for the first identity.

17. The system of claim 11, wherein the memory contains further instructions which when executed by the processing circuitry further configure the system to:

apply the control on the generated representation to include any one of:

disable the first identity, blocking the first identity from performing additional operations, halting request-execution capabilities associated with the first identity, preventing the first identity from accessing enterprise computing resources, or any combination thereof.

18. The system of claim 11, wherein the memory contains further instructions which when executed by the processing circuitry further configure the system to:

generate a behavior baseline of the first identity based on a plurality of actions initiated by the first identity; and determine that the first identity is associated with the AI agent based on the behavior baseline matching a predetermined agentic behavior.

19. The system of claim 18, wherein the memory contains further instructions which when executed by the processing circuitry further configure the system to:

determine that the first identity is associated with the AI agent based on the behavior baseline mismatching a predetermined human user behavior baseline.

* * * * *